(12) United States Patent
Kalavade

(10) Patent No.: US 6,901,067 B1
(45) Date of Patent: May 31, 2005

(54) METHOD AND DEVICE FOR GENERATING A PCM SIGNAL STREAM FROM A STREAMING PACKET SOURCE

(75) Inventor: Asawaree P Kalavade, Edison, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/525,696

(22) Filed: Mar. 14, 2000

Related U.S. Application Data

(60) Provisional application No. 60/180,245, filed on Feb. 4, 2000.

(51) Int. Cl.[7] .............................. H04L 12/66; H04J 3/16
(52) U.S. Cl. ........................ 370/352; 370/468; 370/538
(58) Field of Search ................................. 370/352–359, 370/466, 468, 538, 395.64, 467, 545, 316, 320, 321, 484; 375/220, 326, 242–254

(56) References Cited

U.S. PATENT DOCUMENTS

| | | | |
|---|---|---|---|
| 6,044,089 A | 3/2000 | Ferriere | 370/465 |
| 6,067,316 A * | 5/2000 | Amrany et al. | 375/220 |
| 6,141,341 A * | 10/2000 | Jones et al. | 370/352 |
| 6,181,711 B1 * | 1/2001 | Zhang et al. | 370/468 |
| 6,269,095 B1 * | 7/2001 | Neubauer et al. | 370/352 |
| 6,308,222 B1 | 10/2001 | Krueger et al. | 709/247 |
| 6,374,260 B1 | 4/2002 | Hoffert et al. | 707/104.1 |
| 6,385,195 B2 | 5/2002 | Sicher et al. | 370/356 |
| 6,407,680 B1 | 6/2002 | Lai et al. | 341/50 |
| 6,490,451 B1 | 12/2002 | Denman et al. | 455/436 |
| 6,496,798 B1 * | 12/2002 | Huang et al. | 704/230 |
| 6,496,868 B2 | 12/2002 | Krueger et al. | 709/247 |
| 6,549,587 B1 * | 4/2003 | Li | 375/326 |

* cited by examiner

Primary Examiner—Afsar Qureshi

(57) ABSTRACT

A method and device are disclosed which receives packets streamed over a packet network, decodes the packets received to generate a decoded signal stream and filters the decoded signal stream to generate a pulse code modulated (PCM) signal stream. The PCM signal stream may be tailored to conform to the target destination transport requirements, including call channels established over circuit-switched networks, whether wired or wireless, without modifying the capabilities associated with the network infrastructure or the client phone.

40 Claims, 12 Drawing Sheets

METHOD AND DEVICE FOR GENERATING A PCM SIGNAL STREAM FROM A STREAMING PACKET SOURCE

CROSS REFERENCES TO RELATED APPLICATIONS

This application claims the benefit of U.S. Provisional Application No. 60/180,245, filed on Feb. 4, 2000. The application is related to another U.S. patent application, having a filing date of Mar. 14, 2000, and Ser. No. 09/525,595 entitled "Media Gateway Appliance,"(Kalavade 5).

FIELD OF THE INVENTION

The present invention relates to the processing of a streamed media source, especially applicable for audio signal streaming over a circuit-switched service connection.

BACKGROUND OF THE INVENTION

Streaming is a technique for breaking up a media file into packets and sending those packets to the user in sequence, via a packet network such as the Internet or intranet. A receiving computer is able to play the data when it arrives, instead of waiting for the entire file to download. Audio streaming is an extremely popular application on the Internet today, as evidenced by the immense popularity of music and other audio content in the MP3, RealAudio, and Microsoft Media formats. With the increasing proliferation of cellular users, and the trend towards ubiquitous services, it is believed that there could also be an enormous demand for similar streaming applications to cellular phone users, should such capability be developed. A recent study by Arbitron found that over 75% of polled web users expressed interest in portable streaming services, saying they would increase their tuning into streaming programs if these services were available on portable devices.

Audio streaming over the Internet uses a packet-based approach, where the audio source is broken down into packets, each packet is encoded, and sent to the receiving client in sequence. The client receives the packets, decodes them, and plays them out on the receiving terminal. Unfortunately, cellular systems today cannot offer such Internet-style packet-based audio streaming due to limitations at the terminal (client cell phone) and due to limitations of the infrastructure. For example, cellular phones can not support streaming since they do not have decoders (e.g. mp3 decoder) or streaming controls (skip, pause, etc.). Additionally, data rates over the cellular networks today are quite limited and are insufficient to transport encoded streaming packets.

SUMMARY OF THE INVENTION

These and other limitations associated with the prior art are overcome by the present invention which receives packets streamed over a packet network, decodes the packets received to generate a decoded signal stream and filters the decoded signal stream to generate a pulse code modulated (PCM) signal stream. The PCM signal stream may be tailored to conform to the target destination transport requirements, including call channels established over circuit-switched networks, whether wired or wireless, without requiring modification of the capabilities associated with the network infrastructure or the client phone.

BRIEF DESCRIPTION OF THE DRAWINGS

A more complete understanding of the present invention may be obtained from consideration of the following description in conjunction with the drawings in which.

DETAILED DESCRIPTION

Although an embodiment of the present invention is illustrated and described herein as a method and device for accessing Internet audio content provider sources and for converting packet-based streamed audio to a Pulse Code Modulated (PCM) audio signal stream for delivery to a cellular network service provider's client cell phone over a circuit-switched connection, the embodiment is merely illustrative for the purposes of teaching and describing the principles of the present invention and should not be construed as being so limited. The present invention is equally applicable to any device and method for conversion of packet streamed media to a PCM signal stream, regardless of the source packet network type and regardless of the source media file and transport format, and irrespective as to whether the PCM signal stream is delivered to a wireless client's cell phone, a wire-line phone, or via any circuit-switched connection whatsoever.

Figure 1:
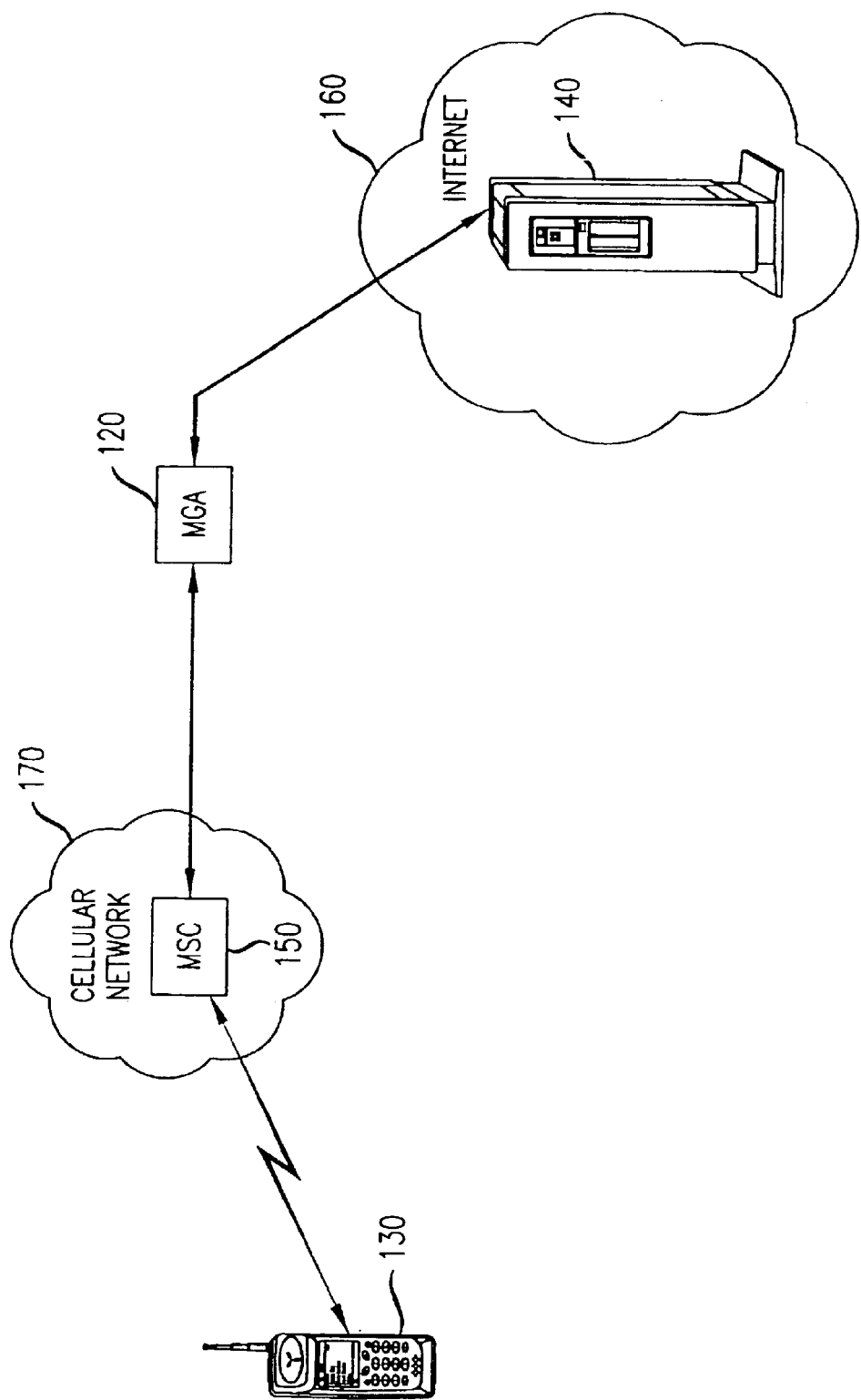
FIG. 1 illustrates an exemplary application of a Media Gateway Appliance (MGA) used to generate a Pulse Code Modulated (PCM) audio signal stream for delivery to a client cellular phone via a wireless network, in accordance with the principles of the present invention.

Referring to FIG. 1, a Media Gateway Appliance (MGA) 120 is shown interposed between a mobile switching center (MSC) 150 of a cellular network 170 and a content provider server 140. Internet Protocol (IP) sessions between the MGA 120 and the content provider server 140 are accomplished over the Internet 160. A cellular network's client cell phone 130 is shown accessing the MSC 150 via the cellular network 170 to establish a wireless circuit-switched connection with the MGA 120. The present invention is agnostic with respect to the various cellular modes and standards, and is compatible with all cellular air interfaces, including, but not limited to Groupe Speciale Mobile (GSM), Time Division Multiple Access (TDMA), Code Division Multiple Access (CDMA), and Advanced Mobile Phone Service (AMPS).

Furthermore, the instant embodiment illustrates the MGA 120 as interfacing the Internet 160 and the cellular network 170, but the MGA 120 is not shown as included within either network. Those skilled in the art would appreciate that the MGA 120 may be implemented in either network while still adhering to the principles of the present invention. In fact, special value may be extracted by incorporating the MGA 120 within either network. For example, incorporating the MGA 120 within the cellular network 170 adds value inuring to the wireless service provider since the provider may: (i) choose to charge additional subscriber fees for client's use of wireless audio (or other media) streaming services, (ii) choose to offer the additional streaming services to entice prospective subscribers away from competitor providers, or both. Alternatively, value may be extracted from MGA 120 services if the MGA is implemented within an Internet domain server as well, whether in conjunction with the content provider server 140 or in conjunction with a third-party server (not shown). Including wireless media streaming services is of value to web-sites, since it will result in more site hits and attract greater numbers of visitors and clients.

The MGA 120 acts as a gateway between the cellular network 170 and the Internet 160. In an exemplary embodiment of the present invention, a client cellular user requests MGA 120 media streaming services by initiating a call to an MGA 120 service telephone number. The MGA 120 is responsible for: (a) establishing a session on the Internet 160 in response to the call request, (b) retrieving packet-based streaming audio content from the content provider server 140, (c) decoding the packet-based streaming audio content, and (d) translating it to a 64 kbps PCM signal stream. The decoded and translated PCM signal stream is then delivered to the client cell phone 130 over a standard speech channel using the underlying services in the cellular network. Therefore, the MGA 120 leverages the circuit-switched ("speech") channel in the cellular network 170 to deliver streaming audio from the MSC 150 to the client cell phone 130. Streaming session control and decoding is performed at the MGA 120. Thus, audio and other media content can be played out utilizing existing cell phones, phones which don't include decoders or streaming audio players. Second, the content is played out over a speech channel. Therefore, special high-bandwidth circuit-switched connections to the cellular network 170 are not required. Since the cellular network 170 receives the audio content from the MGA 120 via a circuit-switched connection, mobility, transport and delivery issues are not encountered. In addition, because the MGA's 120 output signal stream is typically 64kbps PCM, it can be connected directly to the MSC 150, either by co-locating the MGA 120 within the cellular service provider premises, or alternatively, via a direct digital connection into the MSC 150. Such a configuration makes the MGA 120 simple to deploy since changes are not required in the cellular service provider's infrastructure. Thus service providers may use the MGA to deploy audio signal streaming, a next-generation wireless service, while still leveraging their infrastructure.

Figure 2:
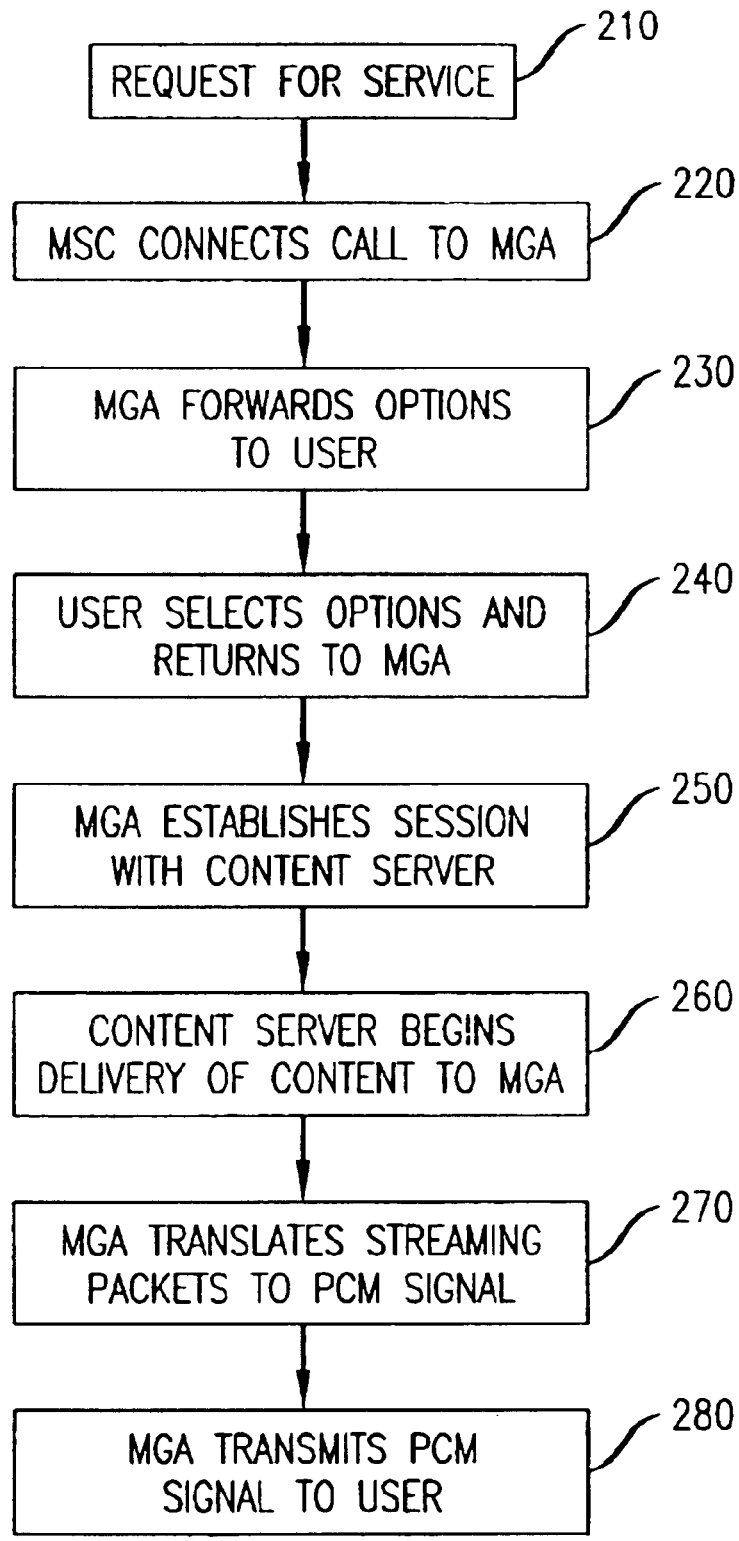
FIG. 2 is a high-level flow diagram illustrating the MGA's function as a gateway between the Internet and the cellular network of FIG. 1, in accordance with the principles of the present invention.

A high-level description of one embodiment describing the MGA's 120 function as a gateway between the Internet 160 and the cellular network 170 may be had by referring to FIG. 2. The client user initiates a media streaming session by requesting service (210). The user begins this process by dialing a phone number from the client cell phone 130 corresponding to the MGA 120. The servicing MSC 150 establishes a connection between the client cell phone 130 and the MGA 120 (220). Once the incoming call is received, the MGA 130 forwards options to the user and solicits a response (230), typically via voice announcement indicating a choice of selections with a request that the user select and press a digit corresponding to her desired selection. Other options for information exchange between the MGA 120 and the user are also well-known and would be apparent to those skilled in the art, two such examples being solicitation and/or response via text or voice messages. The request to the user for option selections is presented within an MGA 120 service presentation layer.

One embodiment of the present invention solicits user response regarding web-site content provider, type and/or genre of music, etc. The MGA 120 provides three types of media streaming services, including: (i) web-casted live content, for example, Internet radio provided by content providers such as SHOUTcast.com or Broadcast.com, (ii) on-demand content providers such as RealNetworks, MP3.com or any of a myriad of web-sites which maintain archived media files at their servers, and (iii) profile playback, which allows users to maintain a user profile database at the MGA 120 server, the profile being used to select content for playback to the client cell phone 130.

The user selects her desired options using the client cell phone 130 (240). Once the user selected options are received at the MGA, the MGA establishes a session with the content provider server 140 (250), and the content provider server 140 begins streaming packets to the MGA 120 (260). The MGA 120 decodes the received packet-based streamed audio and translates to a PCM signal format (270). The MGA 120 then delivers the PCM audio signal stream to the client cell phone 130 via the established circuit-switched connection (280).

Figure 3:
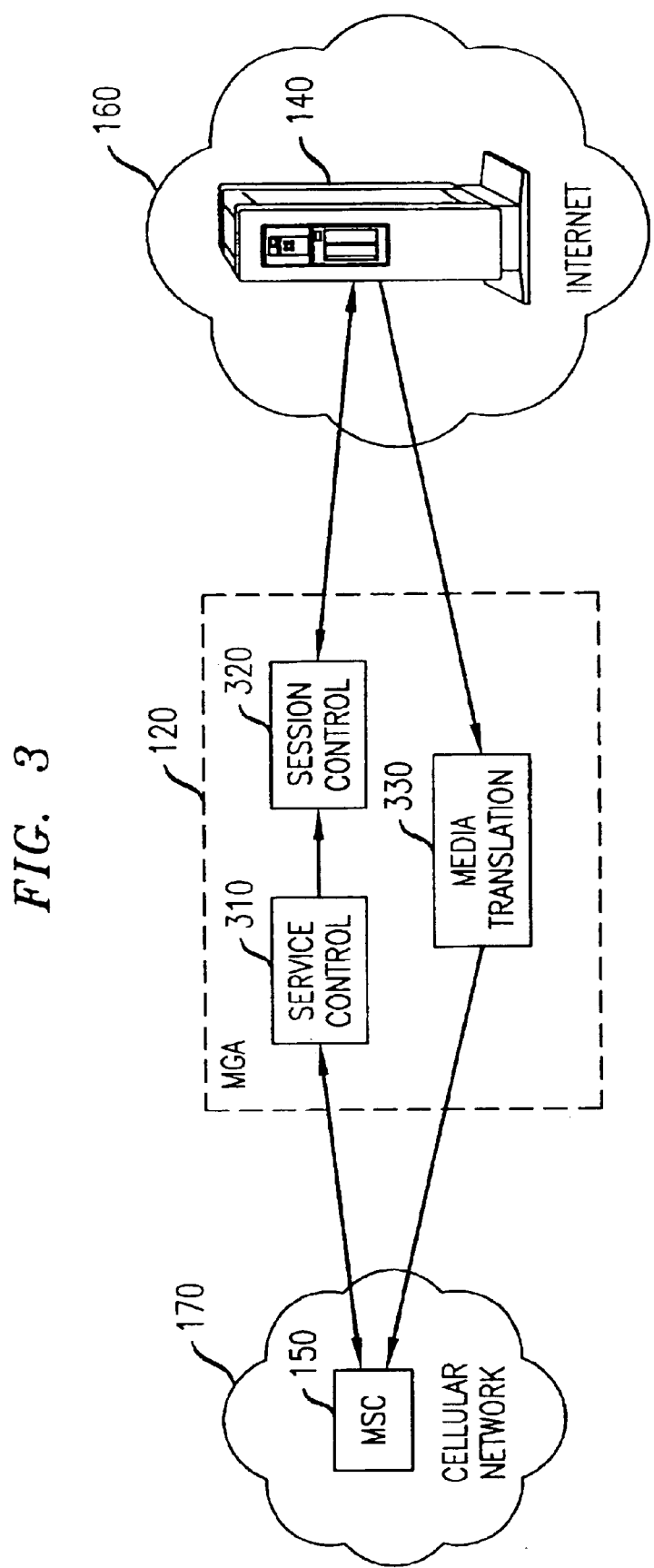
FIG. 3 is a high-level, functional block diagram of one embodiment of the MGA, in accordance with the principles of the present invention.

FIG. 3 is an exemplary illustration of the function and interrelationship of the main functional components of the MGA 120 on a per call connection basis. In one illustrative embodiment of the present invention, the MGA 120 is comprised of three functional components: (i) the service control function 310, (ii) the session control function 320, and (iii) the media translation function 330. The service control function is used as an interface with the call connection established over the circuit-switched cellular network 170. The service control function 310 presents the various service control options to the client cell phone 130, processes requests for service, and processes playback commands. The service control function 310 information exchange with the user may be presented in several formats, including, but not limited to, such illustrative examples as standard interactive voice response (IVR), wireless application protocol (WAP) interface, or VoiceXML (VXML). The session control function 320 is used to interface the MGA 120 with the Internet 160. The session control function 320 establishes and controls sessions with the content provider server 140. The session control function 320 also implements a protocol for converting the client cell phone 130 into a virtual personalized player by translating playback control requests from the client into session commands routed to the content provider server 140. This protocol is called an Audio Session Gateway Protocol (ASGP), and will be described in more detail later in conjunction with FIG. 9. The media translation function 330 receives packet-based streamed audio files over the Internet 160, and decodes and converts the packet-based streamed audio files into a PCM audio signal stream compatible for delivery over a circuit-switched voice channel to the client cell phone 130.

Figure 4:
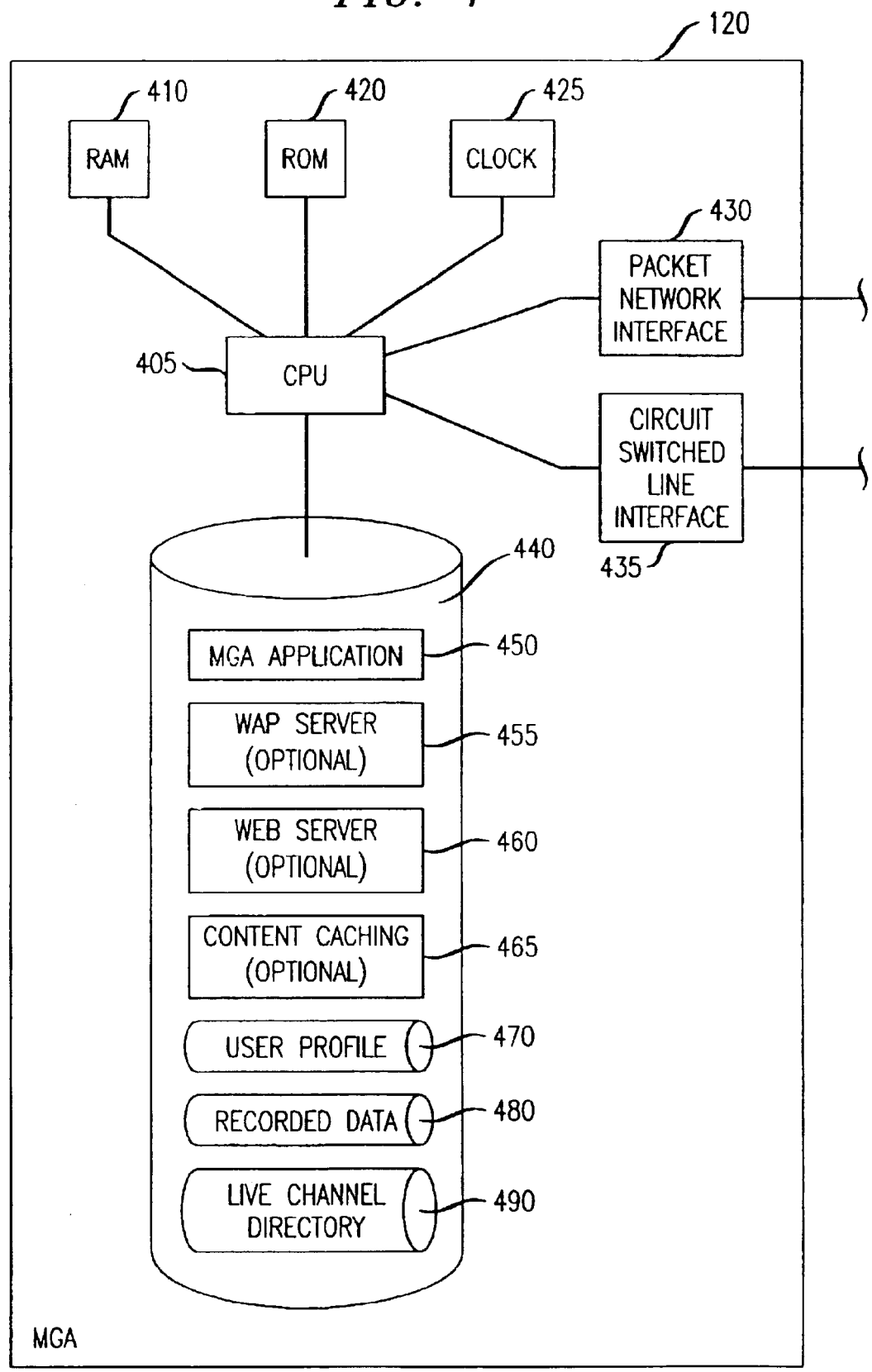
FIG. 4 is a block diagram of the architecture of one embodiment of the MGA, in accordance with the principles of the present invention.

As shown in FIG. 4, the MGA 120 includes a central processor (CPU) 405, random access memory (RAM) 410, read only memory (ROM) 420, clock 425, packet network interface 430, circuit-switched line interface 435, and data storage device 440. A conventional personal computer or computer workstation with sufficient memory and processing capability may be used as the MGA 120. Data storage device 440 may include hard disk magnetic or optical storage units, as well as CD-ROM drives or flash memory. Data storage device 440 contains applications and databases used for the implementation of the present invention, including: MGA application software 450, WAP server application software 455, web server application software 460, content caching software 465, user profile database 470, recorded audio database 480, and live channel directory database 490. WAP server application software 455 is optionally included for use in delivery of web page content from the content provider server 140 to the client cell phone 130. Content caching software 465 is implemented optionally for local storage content at the MGA 120 for repeatedly accessed Internet 160 media files, so that content that is repeatedly accessed does not require repeated downloads from the Internet 160.

The user profile database 470 includes information associated with a client, including, for example, user preferences and/or client cell phone number. In one embodiment of the present invention, user data may be entered in the user profile database 470 utilizing the keypad on the client cell phone. In another embodiment of the present invention, user data may be entered in the user profile database 470 from a personal computer or other information appliance accessing the web (not shown) to use the optional web server application software 460 at the MGA 120. Thus user profile database 470 entries may be created or edited without the benefit of an established connection between the client cell phone 130 and the MGA 120. Recorded audio database 480 is a portion of the data storage device 440 in which the user may store audio files which the user has selected. The live channel directory database 490 is a portion of the data storage device 440 in which information pertaining to available live content channels is maintained at the MGA 120.

Packet network interface 430 is utilized as an interface to the Internet 160. Any appropriate interface may be used, such as an Ethernet interface, as would be known to those skilled in the art. Circuit-switched line interface 435 is utilized as the interface to the cellular network 170. Similarly, such interfaces are also well-known to those skilled in the art.

Figure 5:
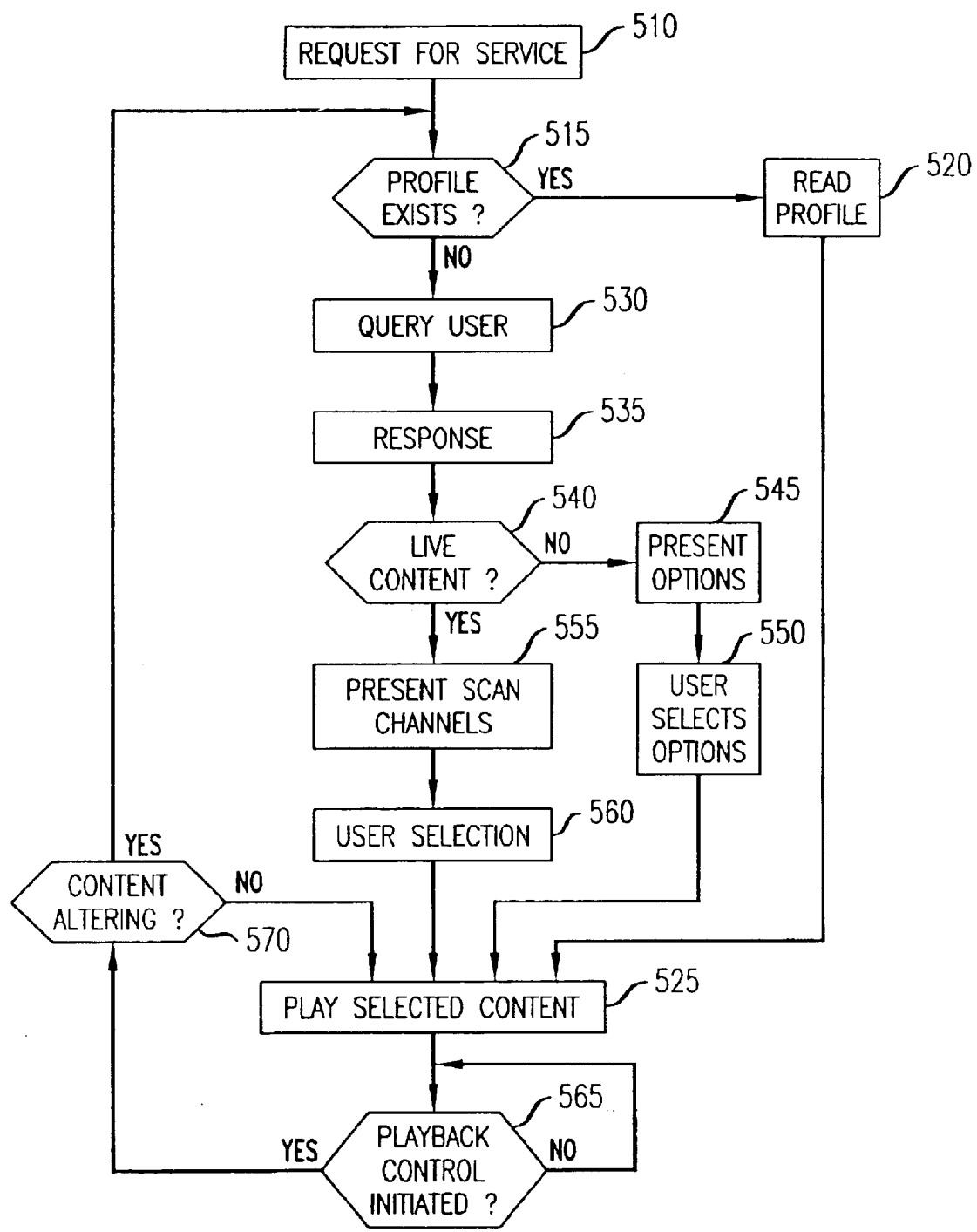
FIG. 5 is a flow diagram illustrating one embodiment of a user interface process, in accordance with the principles of the present invention.

Referring now to FIG. 5, there is shown a flow diagram illustrating an exemplary embodiment of the service control function 310 interfacing sequence with the client cell phone 130 user. The client user initiates a media streaming session by requesting service (510). The user begins this process by dialing a phone number from the client cell phone 130 corresponding to the MGA 120. The service control function 310 for the assigned call connection attempts to identify the client cell phone 130 or a user registration and dips the user profile database 470 to determine if a user profile exists (515). If a user profile does exist, the user profile is then read to return user-selected channel, category, or genre preferences (520). An Internet session with the user-selected content provider server is established and the appropriate content packets are streamed to the MGA 120. The MGA 120 decodes the selected content and translates it to a PCM audio signal stream, which is then launched over the established circuit-switched connection to the client cell phone 130 (525).

If however, a user profile does not exist, then the service control function 310 queries the user regarding her desired session preferences (530). The user selects her desired options using the client cell phone 130 in response to the query (535). The MGA 120 then determines if the user has requested delivery of live content (540).

If the user desires to listen to live content channels, then the user is presented with a set of scan-mode channels and queried for a selection from the available scan-mode channels (555). Scan-mode channels are identified by a cell cast scan channel module of the MGA 120, described in greater detail in conjunction with FIG. 6. The available scan-mode (or cell cast) channels may be presented to the user in several formats, as would be apparent to skilled in the art. In one embodiment of the present invention, audio samples from each of the available scan-mode channels are multiplexed in short audio segments, so that a user can listen to sequential segments of available audio content. One alternative method for scan-mode channel presentation to the user is to forward content playlist or genre text to the user. Once available scan-mode channels are presented, the user responds by selecting a scan-mode channel (560). The user's response is collected via the service control function 310 by any number of well-known alternative collection means, including by way of example, but not limitation, dual tone multi-frequency (DTMF) digit collection, text message recognition, or voice recognition. Once the user has selected a scan-mode channel, the content of the selected scan-mode channel is launched over the established circuit-switched connection to the client cell phone 130 (525).

If however, the user does not desire to listen to live content channels, but rather wishes to invoke on-demand mode channels, then the user is presented with options, typically via voice announcement (545). In one embodiment of the present invention, the options presented may be as to type or genre of audio content desired; such as "Press 1 for classical," Press 2 for jazz," etc. The client cell phone 130 user then selects the desired option (550). The user's response is collected via the service control function 310 by any number of well-known alternative collection means, including by way of example, but not limitation, dual tone multi-frequency (DTMF) digit collection, text message recognition, or voice recognition. Once the user has selected a content option, the selected content is fetched, decoded, translated, and launched over the established circuit-switched connection to the client cell phone 130 (525).

Playback controls are asynchronously enabled (565). Playback controls are available to the client cell phone 130 user to perform various playback and control functions. These are functions typically associated with any audio playback device. Such controls include, by way of example and not limitation, fast forward, reverse, play, record, pause, resume, stop, skip, channel select, mute, etc. Playback control commands are divided into two general types: content altering commands and non-content altering commands (570). Non-content altering commands include those commands in which the content provided to the MGA 120 from the content provider server 140 is to remain unchanged; that is, the user has not selected an alternate media channel for the MGA 120 to stream. Content altering commands include those in which the content provided to the MGA 120 from the content provider server 140 is to be changed; that is, the user has selected an alternate media channel for the MGA 120 to stream.

Figure 6:
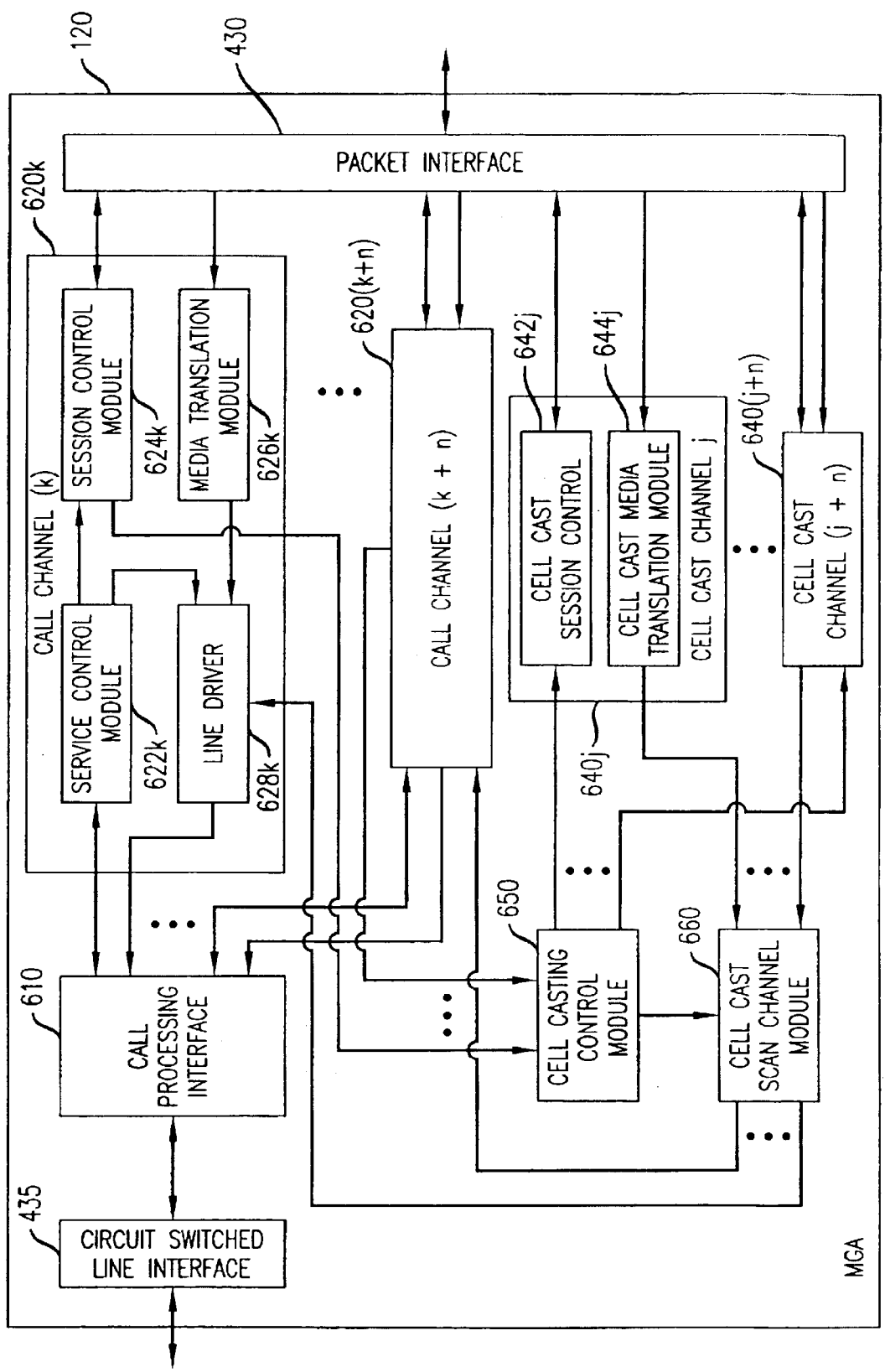
FIG. 6 is a functional block diagram of one embodiment of the MGA, in accordance with the principles of the present invention.

Referring now to FIG. 6, a functional block diagram of one embodiment of the MGA 120 is presented. Functionally, the MGA 120 includes packet interface 430, circuit-switched line interface 435, call processing interface 610, call channels 620 (a total of k+n call channels shown), cell cast channels 640 (a total of j+n cell cast channels shown), cell casting control module 650, and cell cast scan channel module 660. Greater detail of the functional architecture of an individual call channel 620 may be had by referring to call channel k $620_k$, which includes a service control module $622_k$, a session control module $624_k$, media translation module $626_k$, and a line driver $628_k$. Greater detail of the functional architecture of an individual cell cast channel 640 may be had by referring to cell cast channel j $640_j$, which includes a cell cast session control module $642_j$ and a cell cast media translation module $644_j$.

When used within the context of the instant description, the word "coupled" is meant to describe the capability of the functional components and modules so coupled to exchange, relay, correlate, impart, and/or otherwise share various messages, data, communications, signaling, media, and signals, regardless of whether the functional components and modules exist as physical devices or as functional constructs of the MGA's 120 software architecture, and regardless of whether the MGA 120 is implemented in a single computer, distributed over a plurality of computers, or distributed over a plurality of processors and a plurality of data storage devices. Packet network interface 430 is utilized as an interface to the Internet 160. Circuit-switched line interface 435 is utilized as the interface to the cellular network 170. Call processing interface 610 is coupled to: (i) the circuit-switched line interface 435, and (ii) the service control modules 622 and line drivers 628 of respective individual call channels 620. Service control modules 622 are coupled to respective session control modules 624 and line drivers 628. Session control modules 624 are coupled to the packet interface 430 and the cell casting control module 650. Media translation modules 626 are coupled to the packet interface 430 and respective line drivers 628. The cell casting control module 650 is coupled to the cell cast scan channel module 660 and cell cast session control modules 642. Cell cast session control modules 642 are coupled to the packet interface 430, which is in turn coupled to the cell cast media translation modules 644. Cell cast media translation modules are coupled to the cell cast scan channel module 660, which is in turn coupled to the line drivers 628.

The call processing interface 610 performs the function of receiving and terminating client cell phone 130 call connections and assigning client cell phone 130 call connections to call channels 620. Individual call channels 620 are assigned to each call and are comprised of a service control module 622, session control module 624, media translation module 626, and line driver 628.

The service control module 622 performs the service control function 310, which in the instant embodiment of the invention encompasses the illustrative tasks of presenting various service control options to the client cell phone 130, processing requests for service, and processing playback commands. The service control function 310 may utilize any of a number of well-known user interface means, formats, and protocols including, but not limited to, such illustrative examples as standard interactive voice response (IVR), DTMF digit detection and collection, voice recognition, text messaging, wireless application protocol (WAP) interface, or VoiceXML (VXML). The session control module 624 performs the session control function 320, which in the instant embodiment of the invention encompasses the illustrative tasks of maintaining an Internet 160 interface, establishing and controlling Internet sessions with the content provider server 140, implementing the AGSP for converting the client cell phone into a virtual personalized player by translating playback control requests from the client into session commands routed to the content provider server 140. The media translation module 626 performs the media translation function 330, which in the instant embodiment of the invention encompasses the illustrative tasks of receiving packet-based streamed audio files over the Internet 160, and decoding and converting the packet-based streamed audio files into a PCM audio signal stream compatible for delivery over a circuit-switched voice channel to the client cell phone 130. In accordance with the instant embodiment of the invention, the line driver module 628 receives the PCM audio signal stream from the media translation module 626 and launches the audio content for the respective call channel to the client cell phone 130. The line driver module 628 also receives inputs from various processes, including playback options from the session control module 622, on-demand data from the media translation module 626, and live content, scan-mode channels and live channel directory information associated with cell cast channels 640.

In the case of live content, the MGA 120 is designed to support the multi-casting of a single PCM audio signal stream to a plurality of users, that is to one or more client cell phones 130, without requiring the replication of resources on a per call channel 620 basis for each call connection to each client cell phone 130. I call this mode of multi-casting "cell casting." Cell Casting reduces the bandwidth and processing overhead when a plurality of clients want to listen to the same content. In accordance with the instant illustrative embodiment of the invention, cell casting is supported by the MGA 120 in the following manner. The cell casting control module 650 establishes content sessions with one or more Internet broadcast channels over the packet interface 430. The cell casting control module 650 maintains a list of each of the sessions established and the cell cast channels 640 through which corresponding session data is processed, the content provider server address 140, and the group of client users currently subscribing to each of the cell cast channels 640. Each cell cast channel 640 is comprised of a cell cast session control module 642 and a cell cast media translation module 644, with functionality replicating the functionality of individual call channel's similarly-named session control modules 624 and media translation module 626. The cell cast scan channel module 660 provides the previously described scan-mode channel presentation for a client cell phone 130 user. That is, if a user desires to listen to live content channels, then the user is presented with a set of scan-mode (or cell cast) channels and queried for a selection from the available scan-mode channels. Scan-mode channels are identified by the cell cast channel module and presented to the user in any of several formats, as would be apparent to those skilled in the art. In one embodiment of the present invention a scan-mode channel presentation format which is thought to be especially useful, in the context of delivery of PCM audio signal stream to a client cell phone 130, is to provide audio samples from each of the available cell cast channels 640 which are multiplexed in short audio segments, so that a user can listen to sequential segments of available audio content. Upon hearing a short audio segment which the user desires to have delivered, the user selects the desired audio content and the MGA 120 delivers a PCM audio signal stream corresponding to the selected cell cast channel 640 content. As previously described, it would be apparent to those skilled in the art to provide other well-known alternative presentation types and methods representing the available cell cast channels 640. Once available cell cast channels 640 are presented, the user may respond by selecting a particular cell cast channel. The user's response is collected via the service control function 310 by any one of a number of well-known alternative collection means, including by way of example, but not limitation, dual tone multi-frequency (DTMF) digit collection, text message recognition, or voice recognition. Once the user has selected a cell cast channel 640, the content of the selected cell cast channel 640 is launched over the established circuit-switched connection to the client cell phone 130.

Figure 7:
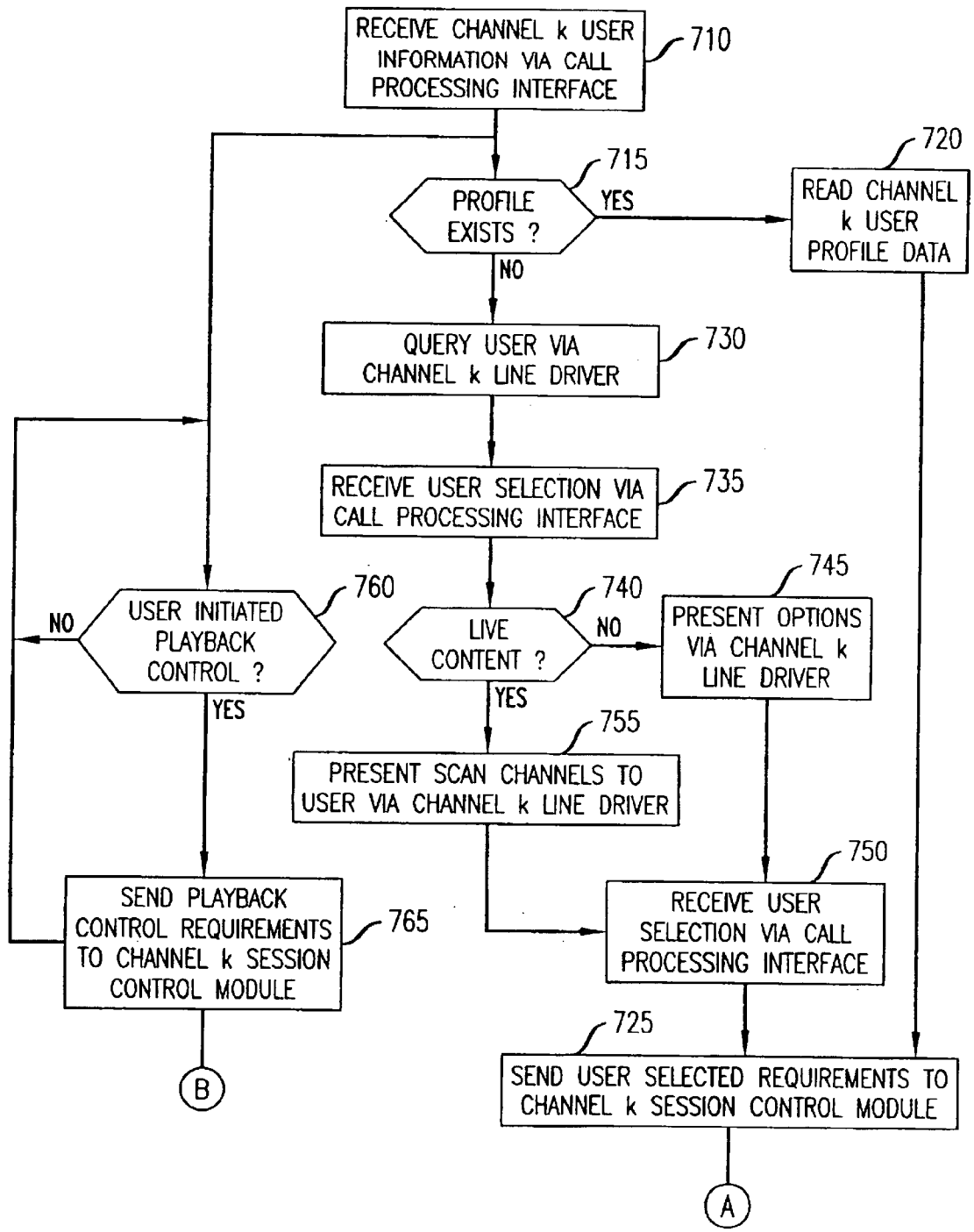
FIG. 7 is a flow diagram illustrating one embodiment of a Service Control is Module's processes, in accordance with the principles of the present invention.

FIG. 7 is a flow diagram showing the processes performed by a service control module 622 in an illustrative embodiment of the present invention. Although the processes described in conjunction this and subsequent figures are directed towards call channel k $620_k$ and cell cast channel j $640_j$, the processes are representative of other channels as well, and apply equally to any call channel 620 and any cell cast channel 640. Upon initiating a call for service to the MGA 120, service control module $622_k$ receives and parses user-identifying information pertaining to the user's client cell phone 130 via the call processing interface 610 (710). Such information may be determined through the use of user-supplied per-call information, recalled stored data ascertained by association with Caller-ID data, or any other means selected from a variety of well-known methods for dial-up user account identification. Service control module $622_k$ determines whether a user profile exists for the instant caller (715). If so, the service control module $622_k$ dips the user profile database 470 of the data storage device 440 for pertinent profile data associated with the user allocated to call channel module k $622_k$ (720). User requirements, as determined by the user profile database 470, are then forwarded to the channel k session control module $624_k$ (720).

If however, a profile does not exist for the user, then the service control module $622_k$ queries the user regarding her desired session preferences (730). Once the user selects her session preferences, those preferences are forwarded and received by the service control module $622_k$ (735). A determination is made as to whether the user has selected live content as a preference (740). If the user has requested delivery of live content, then a set of scan-mode channels are presented to the user, via call channel k line driver $628_k$, to elicit a user response concerning her desired selection of live content (755). For example, in an embodiment of the present invention in which options are presented to the user via voice announcement and the user's response gathered via DTMF digit collection, a presentation script to the user may be as follows: "You are about to listen to audio clips representative of the available live content channels. Each clip is only 5 seconds in length. Please indicate your desired channel by selecting the number '1' on your phone when you hear the content you wish to listen to. The audio clips are looped and will repeat should you miss a selection the first time it is played."

Alternatively, if the user has not requested live content, that is, the user desires content in the on-demand mode, then call channel k line driver $628_k$ presents the user with various options for on-demand content (745). For example, in an embodiment of the present invention in which options are presented to the user via voice announcement and the user's response gathered via DTMF digit collection, a presentation script to the user may be as follows: "If you wish to listen to news, please push '1' now ... if you wish to listen to classical music, please push '2' now... "

Figure 8:
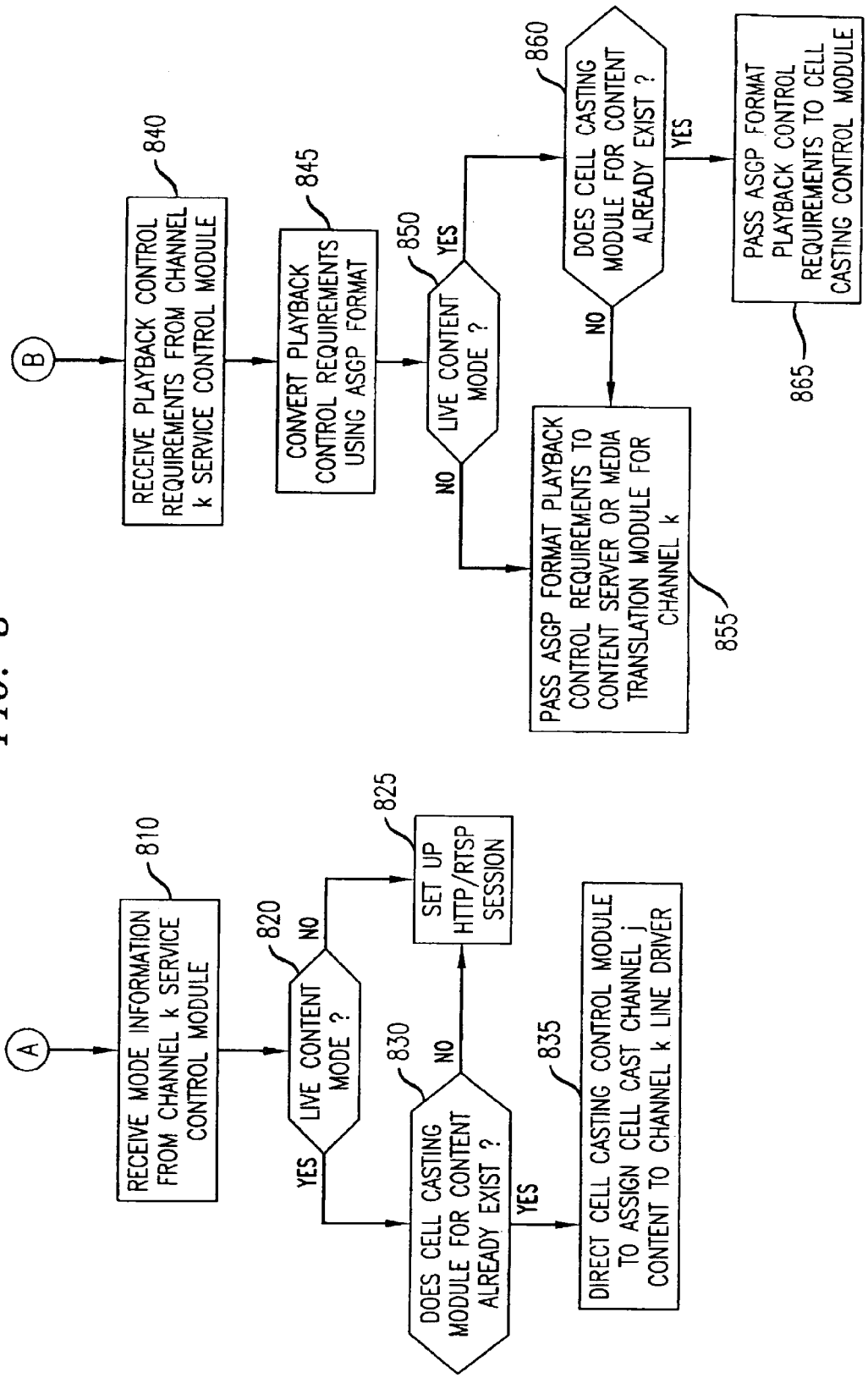
FIG. 8 is a flow diagram illustrating one embodiment of a Session Control Module's processes, in accordance with the principles of the present invention.

Regardless of whether live content or on-demand content is selected, the user selection is received by the call processing interface (750) and forwarded to the call channel k session control module $624_k$ ((725)—go to match point A of FIG. 8).

Playback controls are asynchronously enabled (760). Playback controls are available to the client cell phone 130 user to perform various playback and control functions. These are functions typically associated with any audio playback device. Such controls include, by way of example and not limitation, fast forward, reverse, play, record, pause, resume, stop, skip, channel select, mute, etc. Playback control requirements, when selected, are forwarded to the call channel k session control module $624_k$ ((765)—go to match point B of FIG. 8).

FIG. 8 is a flow diagram showing the processes performed by a session control module 624 in an illustrative embodiment of the present invention. The processes are described in conjunction with call channel k $620_k$, although they apply equally to the session control module 624 of any call channel 620. Upon receipt of mode requirements from the corresponding service control module $622_k$((810)—from matchpoint A of FIG. 7), the session control module $624_k$ ascertains whether the requested channel is a live content mode or on-demand mode source (820). If an on-demand mode source is requested, the session control module $624_k$ initiates and establishes a HyperText Transfer Protocol (HTTP)/Real Time Streaming Protocol (RTSP) session with the content server to provide the requested media file (825). If however, a live content mode source is requested, the session control module $624_k$ first performs a check to determine whether a cell cast channel 640 is already receiving, decoding and translating the requested source file (830). This step is performed for purposes of efficiency. That is, it would be unnecessary to replicate the establishment of a session, and the decoding, and translating of a streamed packet audio file, if all of those processes were already performed for a user assigned to another call channel(s). Therefore, should it be determined that the requested content source is already being received and processed via a cell cast channel (say cell cast channel j $640_j$, for the purposes of this description), then the cell casting control module adds call channel k $620_k$ to the list of channels being provided content from cell cast channel j $640_j$, and the PCM audio signal stream generated by cell cast channel j $640_j$ is delivered to the line driver $628_k$, associated with call channel k $620_k$, in addition to the call channels 620 previously assigned (835). If however, no cell casting channel 640 is processing the requested content, then the session control module $624_k$ initiates and establishes an HTTP/RTSP session with the content server to provide the requested media file (825).

Figure 9:
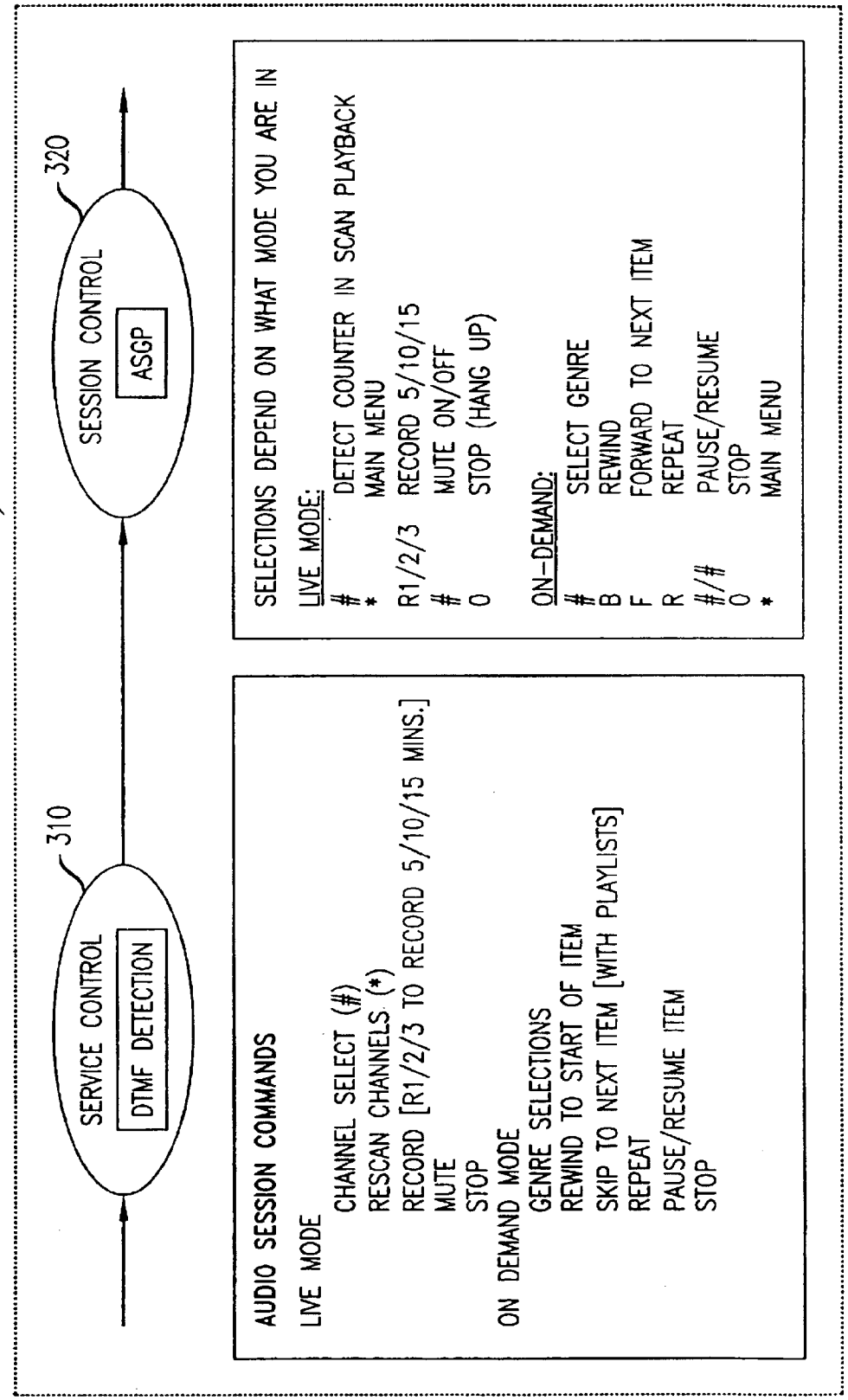
FIG. 9 is an illustration of an exemplary embodiment of the mapping of the Audio Session Gateway Protocol (ASGP), in accordance with the principles of the present invention.

Upon receipt of a playback control requirement from call channel k service control module $622_k$ ((840)—from matchpoint B of FIG. 7), the session control module $624_k$ converts the playback control requirements utilized by the service control module $622_k$ into a format appropriate for the packet streaming content server. The conversion is accomplished utilizing the audio session gateway protocol (ASGP) developed in conjunction with the instant invention (845). In one exemplary embodiment of the present invention, the ASGP converts user selected DTMF digits into command formats appropriate for the content provider server 140 format utilized (i.e.—a command to pause audio playback, although common at the user interface, requires different conversions by the ASGP for different audio content players). FIG. 9 is representative of an ASGP conversion mapping 900 for an exemplary embodiment of the present invention.

The session control module $624_k$ ascertains whether the requested channel is a live content mode or on-demand mode source (850). If the requested channel is an on-demand mode source, then the playback control requirements converted by the ASGP are forwarded to the content provider server 140 or the media translation module $626_k$, as appropriate (855). Differentiation as to whether the ASGP command is forwarded to the content provider server 140 or the media translation module $626_k$ is determined by the actual command type. For example, certain playback control commands, such as "skip to the next item" or "rewind," control the streaming of packets from the content provider server 140 to the MGA 120 and therefore must necessarily be forwarded to the content provider server 140 itself. Other commands, such as volume control changes, are not content or content-delivery altering, and only need to be forwarded to the media translation module $626_k$.

If the requested channel is a live content mode source, the session control module $624_k$ ascertains whether a cell cast channel 640 is already receiving, decoding and translating the requested source channel (860). As before, this step is performed for purposes of efficiency. If the requested source channel content is already being received, decoded, and translated by a cell casting module, then the ASGP format playback control command is forwarded to the cell casting control module (865). If not, then the ASGP format playback control command is forwarded to the content provider server 140 or the media translation module $626_k$, as appropriate (855).

Figure 10:
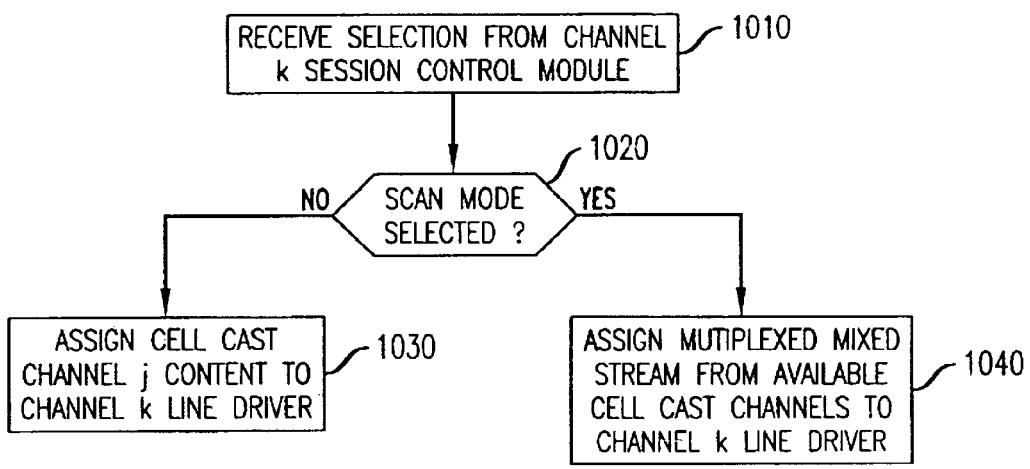
FIG. 10 is a flow diagram illustrating the cell casting processes for one exemplary embodiment of the present invention.

FIG. 10 is a flow diagram illustrating the cell casting processes in one exemplary embodiment of the present invention. As previously described, cell casting is a form of multi-casting of a single PCM audio signal stream to a plurality of users, that is to one or more client cell phones 130, without requiring the replication of resources on a per call channel 620 basis for each call connection to each client cell phone 130. Upon receiving user-selected requirements (1010), the session control module $624_k$ determines whether the user has selected to review the previously described scan-mode channels (1020). If scan-mode is selected, then audio samples from each of the available cell cast channels 640, in the form of short audio segments, are multiplexed by cell cast scan channel module 660 into a single audio stream, and delivered to the call channel k line driver $628_k$ (1040). This single audio stream represents the content from all of the live audio streams multiplexed into one stream, allowing the user to select her choice from the available cell cast channels 640. If scan-mode is not selected, then the selected cell cast channel 640 content (cell cast channel j 640, in the instant example) is assigned and launched to the call channel k line driver $628_k$ (1030).

Figure 11:
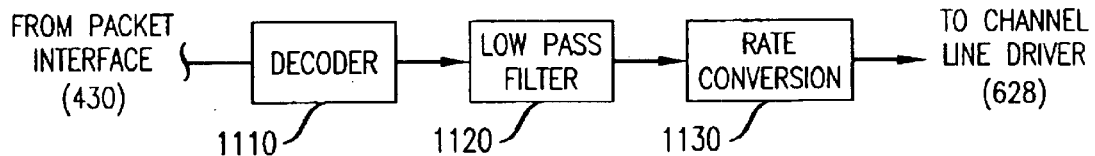
FIG. 11 is a block diagram of one-embodiment of a Media Translation Module, in accordance with the principles of the present invention.

FIG. 11 is a block diagram of a media translation module 626, in accordance with an exemplary embodiment of the present invention. The media translation module 626 is comprised of a decoder 1110, a low pass filter 1120, and a rate converter 1130. Content packets streamed from the content provider server 140 to the MGA 120 arrive at the packet interface 430 and are delivered to the decoder 1110. The decoder 1110 is a matched type, whether proprietary or non-proprietary, for the selected content provider server 140 format type. Therefore, in an exemplary embodiment of the present invention, multiple decoder types are implemented within the media translation module 626 to accommodate selection from any of several content providers. For example, the media translation module may include decoder types to decode MP3, RealAudio, and Microsoft Media formats. Other decoder types may also be added as needed or desired. The decoder 1110 functions to receive a packet stream from the content provider server 140 and generates a decoded bit stream output; for example, a bit stream having a sampled rate of 44.1 or 48 kHz. In an exemplary embodiment of the present invention, the desired PCM signal stream output is 8 kHz. The decoder 1110 output is passed through a low pass filter 1120 to avoid difficulties associated with aliasing. The low pass filter 1120 output is then applied to a rate conversion filter (the rate converter 1130) to reduce the sampling rate to the appropriate rate (8 kHz in the instant example). One implementation of the rate converter utilizes a multi-stage filter to reduce filter length. In a practical implementation of the media translation module 626, the functions of the low pass filter 1120 and the rate converter 1130 may be implemented together as a poly-phase filter. The output of the rate converter 1130 is a PCM signal stream sent to the line driver 628 of the appropriate call channel 620 for delivery to the client cell phone 130.

Figure 12:
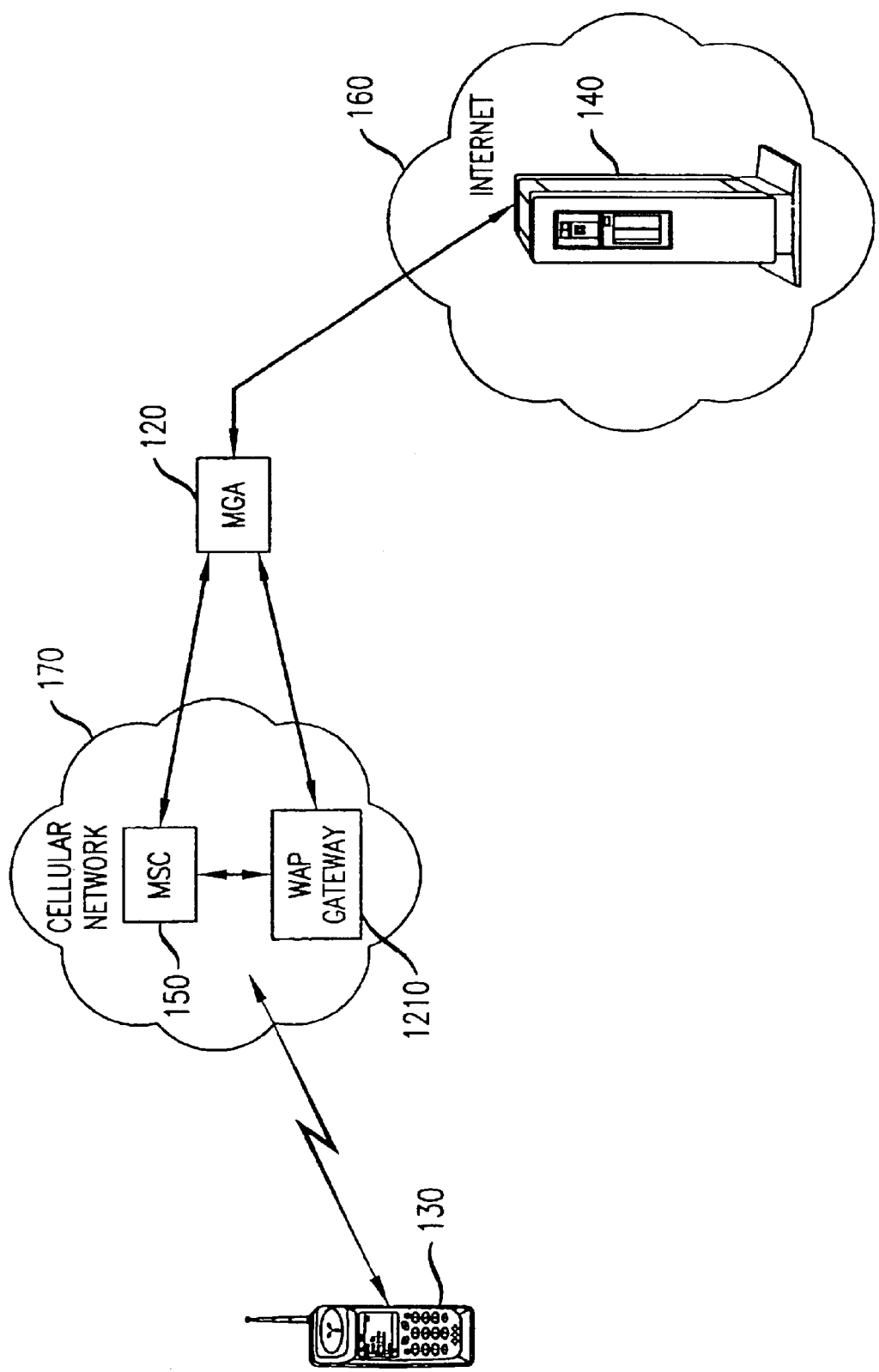
FIG. 12 illustrates an exemplary application of the MGA used in conjunction with Wireless Application Protocol (WAP) functionality, in accordance with the principles of the present invention.

One advantageous feature of the MGA 120 is that it is designed to function with current and emerging technologies (such as WAP compliant networks and cellular phones). FIG. 12 illustrates an exemplary application of the MGA 120 used in conjunction with a WAP compliant network, in accordance with the principles of the present invention. A brief description of the MGA 120 in this context follows that previously provided in conjunction with FIG. 1, with the following exceptions. Typically, for WAP compliant cellular networks, a WAP gateway 1210 is provided as a integral component of the cellular network 170. When a specified URL is requested by a WAP compliant cell phone 130, the URL is forwarded to the WAP gateway 1210, which is translated into an HTTP request.

Figure 13:
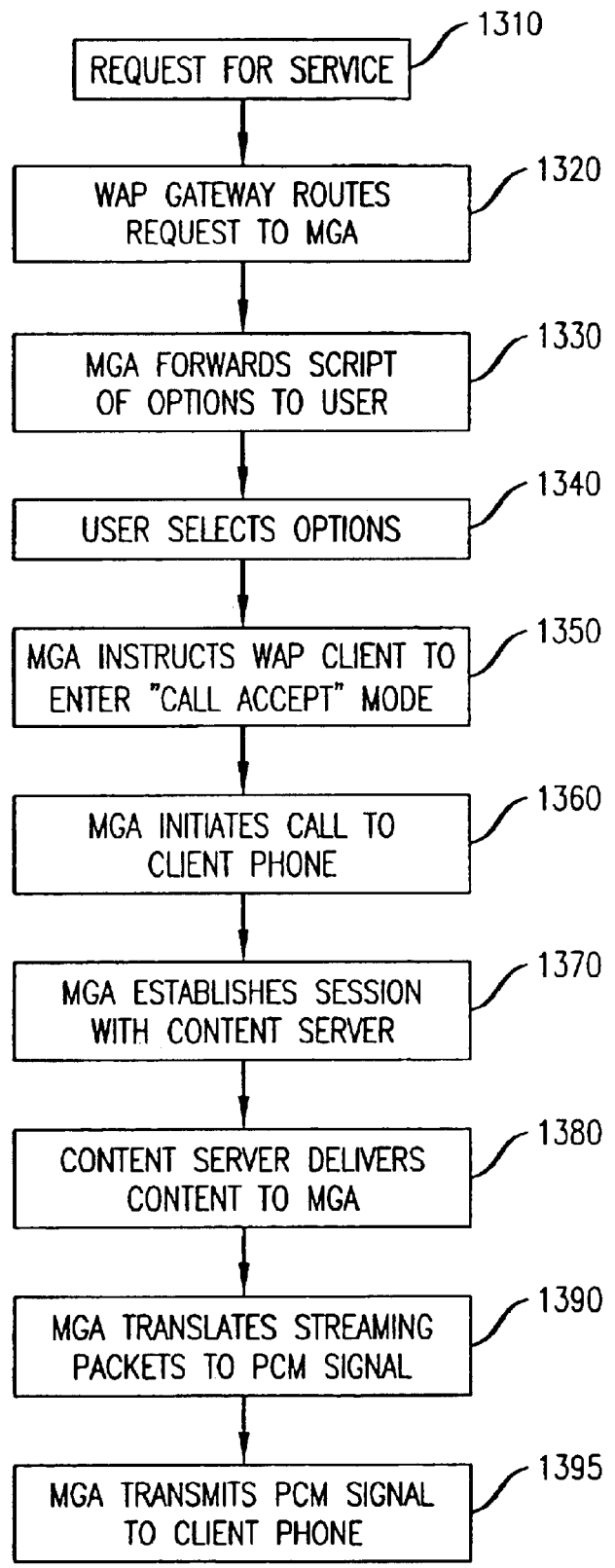
FIG. 13 is a flow diagram illustrating the MGA's function as a gateway between the Internet and the WAP cellular network of FIG. 12, in accordance with the principles of the present invention.

FIG. 13 is a flow diagram illustrating an exemplary embodiment of the present invention in which the MGA 120 functions as a gateway between the Internet and the WAP compliant cellular network of FIG. 12. The client user initiates a media streaming session by requesting service (1310). The user begins this process by utilizing a WAP browser to request an audio streaming application. The WAP gateway 1210 translates the request into an HTTP request, delivered to the WAP server associated with the MGA 120 (1320). The WAP server and the MGA 120 may be implemented on the same computer or server, or alternatively, may exist on separate machines interconnected via an IP link. The MGA 120 returns a script to the client cell phone 130, the script including user-selectable options (1330). The user selects her desired options (1340) and returns the completed script to the MGA 120. The MGA 120 then instructs WAP client to enter "call accept" mode (1350). The MGA 120 then initiates a call connection to the client cell phone 130 through the MSC 150 (1360). The MGA 120 establishes a session with the content provider server 140 (1370) to initiate streaming audio. The MGA 120 receives packets of streamed audio content launched from the content provider server 140 (1380). The MGA 120 decodes and translates the streaming packets into a PCM audio signal stream (1390) and launches the signal stream over the established call connection to the client cell phone 130 (1395).

An exemplary embodiment of the present invention was constructed as an MGA 120 prototype. The MGA prototype is implemented on a standard PC running Windows NT. The PC is equipped with line cards to terminate the circuit-switched call connection (Dialogic D240/PC1-T1 or Natural Microsystems AG4000). As an interface to the Internet, the prototype is connected via an Ethernet high-speed link.

The foregoing description merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

The functions of the various illustrated or described elements, including functional blocks labeled as "CPUs" or "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of excuting software, and may implicitly include, without limitation, digital signal processor (DSP) hardware, read-only memory (ROM) for storing software, random access memory (RAM), and non-volatile storage. Other hardware, conventional and/or custom, may also be included.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein.

What is claimed is:

1. A method for generating a pulse code modulated (PCM) signal stream from a plurality of streamed packets, comprising:

establishing a session with a content provider server in response to a request from a client device;

receiving said plurality of streamed packets from said content provider server over a packet network in response to said session;

decoding said plurality of streamed packets to generate a decoded signal stream;

filtering said decoded signal stream to generate said PCM signal stream; and rate converting said PCM signal stream.

2. The method of claim 1 wherein said step of filtering utilizes a low pass filter.

3. The method of claim 1 further comprising the step of launching said PCM signal stream for transmission over a circuit switched network.

4. The method of claim 3 wherein said circuit switched network is a cellular network.

5. The method of claim 4 wherein said packet network is an IP based network.

6. The method of claim 4 wherein said packet network is the Internet.

7. The method of claim 5 wherein said PCM signal stream is a media signal stream.

8. The method of claim 7 wherein said media signal stream is an audio signal stream.

9. The method of claim 7 wherein said media signal stream is a video signal stream.

10. The method of claim 7 wherein said media signal stream is a text signal stream.

11. A method for generating a pulse code modulated (PCM) streamed audio signal from a plurality of streamed packets, said PCM streamed audio signal suitable for conveyance over a circuit switched call connection, said method comprising the steps of:

establishing a session with an Internet content provider server in response to a request from a client device;

receiving said plurality of streamed packets from said Internet content provider server over the Internet in response to said session;

decoding said plurality of streamed packets to generate a decoded signal stream;

converting the bit rate of said decoded signal stream to generate a converted signal stream compatible with said circuit switched call connection; and filtering said converted signal stream to generate said PCM streamed audio signal.

12. The method of claim 11 wherein said circuit switched call connection is provided over a wireless network.

13. The method of claim 12 wherein said wireless network is a cellular network.

14. The method of claim 13 wherein said cellular network is a time division multiple access (TDMA) network.

15. The method of claim 13 wherein said cellular network is a code division multiple access (CDMA) network.

16. The method of claim 13 wherein said cellular network is a Groupe Speciale Mobile (GSM) network.

17. An apparatus for generating a pulse code modulated (PCM) streamed audio signal from a plurality of streamed packets, said PCM streamed audio signal suitable for con veyance over a circuit switched call connection, said apparatus comprising:
    means for establishing a session with an Internet content provider server in response to a request a client device;
    means for receiving said plurality of streamed packets from said Internet content provider server over the Internet in response to said session;
    means for decoding said plurality of streamed packets to generate a decoded signal stream;
    means for converting the bit rate of said decoded signal stream to generate a converted signal stream compatible with said circuit switched call connection; and
    means for filtering said converted signal stream to generate said PCM streamed audio signal.

18. The apparatus of claim 17 wherein said circuit switched call connection is provided over a wireless network.

19. The apparatus of claim 18 wherein said wireless network is a cellular network.

20. An apparatus for generating a pulse code modulated (PCM) streamed audio signal from a plurality of streamed packets; said PCM streamed audio signal suitable for conveyance over a circuit switched call connection, said apparatus comprising:
    a service control interface for receiving a request from a client device to establish a session with an Internet content provider server;
    a packet interface for receiving said plurality of streamed packets from said Internet content provider server in response to said session;
    a decoder for decoding said plurality of streamed packets to generate a decoded signal stream;
    a rate converter for converting the bit rate of said decoded signal stream to generate a converted signal stream compatible with said circuit switched call connection; and
    a filter for filtering said converted signal stream to generate said PCM streamed audio signal.

21. The apparatus of claim 20 wherein said rate converter converts the bit rate of said decoded signal stream to 64 kbps.

22. The apparatus of claim 20 wherein said circuit switched can connection is provided over a wireless network.

23. The apparatus of claim 22 wherein said wireless network is a cellular network.

24. The apparatus of claim 20 wherein said filter is a low pass filter.

25. The apparatus of claim 24 wherein said low pass filter is utilized to prevent aliasing.

26. An apparatus for generating a pulse code modulated (PCM) streamed audio signal from a plurality of streamed packets, said PCM streamed audio signal suitable for conveyance over a circuit switched call connection, said apparatus comprising:
    a service control interface for receiving a request from a client device to establish a session with an Internet content provider server;
    a packet interface for receiving said plurality of streamed packets from said Internet content provider server over the Internet in response to said session;
    a processor; and
    a memory coupled to said processor and including instructions for controlling said processor,
    said processor operative with said instructions in said memory to;
    decode said plurality of streamed packets to generate a decoded signal stream;
    convert the bit rate of said decoded signal stream to generate a converted signal stream compatible with said circuit switched call connection; and
    filter said converted signal stream to generate said PCM streamed audio signal.

27. An apparatus for generating a pulse code modulated (PCM) signal stream from a plurality of streamed packet, said apparatus comprising:
    means for establishing a session with a content provider server in response to a request from a client device;
    means for receiving said plurality of streamed packets from said content provider server over a packet network in response to said session;
    means for decoding said plurality of streamed packets to generate a decoded signal stream;
    means for filtering said decoded signal stream to generate said PCM signal stream; and
    means for rate converting said PCM signal stream.

28. The apparatus of claim 27 further comprising a switched circuit interface for transmitting said PCM signal stream over a circuit switched call connection.

29. The apparatus of claim 27 wherein said packet network is an IP based network.

30. The apparatus of claim 27 wherein said packet network is the Internet.

31. The apparatus of claim 27 wherein said PCM signal stream is a media signal stream.

32. The apparatus of claim 31 wherein said media signal stream is an audio signal stream.

33. The apparatus of claim 31 wherein said media signal stream is a video signal stream.

34. The apparatus of claim 31 wherein said media signal stream is streaming text.

35. The apparatus of claim 27 wherein said means for filtering is a low pass filter.

36. The apparatus of claim 27 wherein said low pass filter is utilized to prevent aliasing.

37. An apparatus for generating a pulse code modulated (PCM) signal stream from a plurality of streamed packets, said apparatus comprising:
    a gateway for establishing a session with a content provider server in response to a request from a client device and receiving said plurality of streamed packets from said content server over a packet network in response to said session;
    a decoder for decoding said plurality of streamed packets to generate a decoded signal stream;
    a filter for filtering said decoded signal stream to generate said PCM signal stream;
    a rate converter for rate converting said PCM signal stream.

38. The apparatus of claim 37 wherein said filter is a low pass filter.

39. The apparatus of claim 38 wherein said low pass filter is utilized to prevent aliasing.

40. An apparatus for generating a pulse code modulated (PCM) signal stream from a plurality of streamed packets, said apparatus comprising:
    a processor; and
    a memory coupled to said processor and including instructions for controlling said processor, said processor operative with said instructions in said memory to:

establish a session with a content provider server in response to a request from a client device;

receive said plurality of streamed packets from said content server over a packet network in response to said session;

decode said plurality of streamed packets to generate a decoded signal stream;

translate said decoded signal stream into said PCM streamed audio signal; and rate convert said PCM steamed audio signal.

* * * * *